United States Patent [19]

Singh et al.

[11] 4,089,906

[45] May 16, 1978

[54] METHOD FOR THE PREPARATION OF POLYTHIOETHERS FROM THIODIETHANOL USING ACIDIC CARBON

[75] Inventors: Ajaib Singh, Somerville, N.J.; Joseph Lawrence Schmitt, Jr., Bethel, Conn.

[73] Assignee: American Cyanamid Company, Stamford, Conn.

[21] Appl. No.: 736,024

[22] Filed: Oct. 27, 1976

[51] Int. Cl.$^2$ .............................................. C07C 148/00
[52] U.S. Cl. ............................... 260/609 R; 260/609 F
[58] Field of Search ............ 260/609 F, 609 R, 615 B

[56] References Cited

U.S. PATENT DOCUMENTS

| | | | |
|---|---|---|---|
| 2,133,480 | 10/1938 | Schoeller et al. ................ | 260/615 B |
| 2,518,245 | 8/1950 | Morris et al. ..................... | 260/609 R |
| 3,121,733 | 2/1964 | von Schickh et al. ............ | 260/465.2 |
| 3,163,620 | 12/1964 | von Brachel .................... | 260/609 R |

OTHER PUBLICATIONS

F. Richter et al., JACS, 74, 4076–4079, (1952).
Union Carbide, Application Bulletin F-5764D, Oct., 1965.

*Primary Examiner*—Joseph Paul Brust
*Assistant Examiner*—Molly C. Eakin
*Attorney, Agent, or Firm*—Frank M. Van Riet

[57] ABSTRACT

Preparation of polythioethers by the polycondensation of thiodiethanol in the presence of an acid-acting carbon.

4 Claims, No Drawings

METHOD FOR THE PREPARATION OF POLYTHIOETHERS FROM THIODIETHANOL USING ACIDIC CARBON

This invention relates generally to the preparation of polythioethers, and more particularly to the preparation of polythioethers by the polycondensation of thiodiethanol in the presence of an acid-acting carbon.

Thiodiethanol is a well-known diol, the hydroxyl groups of which exhibit unusual reactivity because of their positioning beta to a sulfur atom in an aliphatic chain. In the polycondensation of thiodiethanol in the presence of p-toluenesulfonic acid, or sulfuric acid, or any of the other commonly used etherifying catalysts, the side reactions which occur, mainly by ring closure, are sufficiently great as to severely limit the yields of the polycondensate to about 40 to 60%. These cyclic by products include large amounts of thioxane and some dithiane, both of which have an extremely unpleasant odor.

Schmelzer et al, in their U.S. Pat. No. 3,312,743, addressed themselves to this problem and found that phosphorous acid, or certain of its derivatives, used in catalytic amounts, for example about 0.05 to 10 percent by weight, appreciably minimized the problems of excessive by-product formation.

We have found that phosphorous acid is indeed quite effective in minimizing cyclic by-product formation during the preparation of relatively low molecular weight oligomers of thiodiethanol, such as those suitable for use in the preparation of polyurethanes. However, in subsequent reactions of these oligomers with isocyantes, we have found, as Schmelzer et al recognized, that the acidic residues, is left behind, cause problems. They must, therefore, be removed.

Removing phosphorous acid residues from polythiodiethanol oligomers is tedious, time consuming and expensive. The polymers may be washed, or treated with a base to form insoluble inorganic salts, for example by treating with ammonia or lime, and the salts filtered or centrifuged out. If excess base remains after the treatment it may also lead to problems in subsequent reactions with isocyanates. As a result of these problems phosphorous acid, while an excellent catalyst, shares the disadvantages of other commonly used homogeneous acid etherifying catalysts.

In an effort to find means to effectively catalyze the condensation of thiodiethanol and to avoid or minimize the aforementioned problems, we conducted experiments which led to our discovery that certain acid-acting carbons are excellent catalysts for the condensation, leading to high overall yields of oligomers with minimal cyclic by-product formation. The catalysts, described in more detail below, possess advantages over previously used homogeneous acid catalysts used for these purposes, including phosphorous acid.

1. Ease of removal from the reaction mixture by simple filtration, and
2. Virtually no residual acidity in the polymer after use and removal thereof.
3. The catalyst can be reused several times.

Not every acidic carbon is useful in the present invention. Acid-acting carbons are those which, by virtue of acidic groups on their surface structure, behave as acidic substances in the polyetherification reaction.

For the purposes of the present invention we have found that effective acid-acting carbons are those which satisfy the following activity test:

Activity Test

One gram of the carbon is slurried in 50 ml. of water for 5 minutes, the catalyst is allowed to settle, and the pH of the aqueous medium measured using a standard pH meter. A second sample of (5 grams) is slurried in 50 ml. of water for 5 minutes, and the pH measurement repeated. If the pH of the aqueous medium of the second sample is the same or lower (more acidic) than the pH of the aqueous medium of the first sample, the catalyst is considered to be effective for the polycondensation of thiodiethanol.

Some acidic carbons, when subjected to the above Activity Test, will exhibit an increased pH (become more basic) in the second sample. This effect is illustrated in the examples which follow.

It will be noted that the expression "acid acting," as defined hereinabove, does not require that the supernatant liquid from the aqueous slurry be acidic itself, i.e. that it have a pH below 7, but only that the more concentrated slurry give a lower pH than the more dilute slurry. While applicants do not wish to be bound by any particular explanation for the success of the acid-acting carbons, it is believed that the effectiveness of these catalysts depends on the availability to the reacting organic substances of specific active acidic sites on the carbons, even though certain other sites on the catalyst surface may be basic. The aforementioned activity test is simply a measure of the availability of such acidic sites.

The polycondensation of thiodiethanol is carried out at temperatures above about 150° C, preferably about 170°–200° C, in the presence of from about 0.5 to 20 weight percent, based on the initial charge of reactants, of the carbon catalyst, preferably about 1 to 10 weight percent, same basis. Water formed during the condensation is removed by distillation; a vacuum may be applied to the reaction mixture in the latter stages to effect removal of residual amounts of water. Polymers having molecular weights in the range of about 300 to 4000 are readily obtained, as determined by measurement of the hydroxyl number of conventional methods. A convenient method for monitoring the extent of reaction is to observe changes in the methylene ($CH_2$) to hydroxyl (OH) ratio of an infrared spectrum of the reaction product. The ratio increases as the molecular weight increases and has a good correlation with hydroxyl number. When the reaction is completed the catalyst is filtered while the reaction product is still hot. The acid number of the product is then measured to determine the residual acidity.

The acid-acting carbons are shown to be about as efficient as phosphorous acid in terms of yields, and reaction time under comparable conditions.

Although the foregoing description of the invention generally relates to the polycondensation of thiodiethanol, it will be understood that copolymers of thiodiethanol with other suitable aliphatic alcohols containing two or more hydroxyl groups are within the scope of the invention. Thus, a major proportion of thiodiethanol will co-condense with saturated and unsaturated diols and triols, such as ethylene glycol, propane-1,2-diol, propane-1,3-diol, butane-1,4-diol, hexane-1,6-diol, diethylene glycol, trimethylolpropane, cyclohexane- 1,4-dimethanol, the monoallyl ether of trimethylolpropane, and the like.

The examples which follow will further illustrate the invention.

EXAMPLE 1

Evaluation of Acidity of Carbons

The carbons described below were evaluated for acidity in accordance with the aforementioned test.

Carbon Catalysts

A. Wide pore carbon
B. Activated carbon XH-2, Barneby Cheney
C. Activated carbon G-107, North American Carbon Co.
D. Activated charcoal SK(9489), Barneby Cheney
E. Activated charcoal PK(9488), Barneby Cheney
F. Activated charcoal JV(7580), Barneby Cheney
G. Activated charcoal JF(7717), Barneby Cheney Table I
Evaluation of Acidity of Carbons

| Catalyst | pH 1 gram/50 ml. | pH 5 grams/50 ml. |
|---|---|---|
| A | 5.4 | 5.8 |
| B | 10.3 | 10.5 |
| C | 2.8 | 2.25 |
| D | 5.4 | 5.0 |
| E | 5.6 | 5.8 |
| F | 3.7 | 3.65 |
| G | 7.4 | 7.4 |

EXAMPLE 2

Polymerization of Thiodiethanol

Thiodiethanol (150 grams, 1.23 moles) and 7.5 gram (5% by weight) of activated carbon G-107 (North American Carbon Co.) were heated to 210° C and reacted for 1.5 hours, distilling water as formed in the reaction. A total of 33.5 ml. of distillate was recovered, of which 8 ml. was an oil. The polymer had a hydroxyl number of 114.4 indicating a molecular weight of 980. Based on total distillate the yield of polymer was 78%. The oil represented 5.3% of the initial charge. The catalyst was filtered off and the acid number of the polymer determined to be 0.21, indicating a very low level of residual acidity.

EXAMPLES 3–10

Following the procedure of Example 2, thiodiethanol was condensed with the acidic carbons shown in Table II.

EXAMPLE 11 (Comparative)

Preparation of Polythiodiethanol Using Phosphorous Acid Catalyst

The procedure of Example 2 was followed except that 0.5 percent by weight of phosphorous acid was used as catalyst and the reaction was conducted for 3.5 hours at 180° C. A polythiodiethanol was obtained having a hydroxyl number of 110, molecular weight 980. Total distillate was 19.1% of the total charge (81% yield). The oil represented 4.9% of the initial charge. The acid number of the polymer was 6.2.

EXAMPLE 12 (Comparative)

When the procedure of Example 11 was followed except for a reaction time of 6 hours at 180° C a total of distillate of 21.2% was obtained (about 79% yield). The oil represented 4.9% of the initial charge. The polymer had a hydroxyl number of 38, representing a molecular weight of 2900, and had an acid number of 4.9.

EXAMPLE 13 (Comparative)

The procedure of Example 2 was followed except that 0.2 percent by weight of p-toluenesulfonic acid was used as catalyst and the reaction was conducted for 5.5 hours at 190° C. A total of 29.4% distillate was obtained (70.6% yield) of polymer of which the oily layer represented 15% of the initial charge. The polymer had a hydroxyl number of 58.5 (molecular weight 1900) and an acid number of 3.8.

Examples 11–13 illustrate that phosphorous acid is an effective catalyst, affording polymers in high yields with minimal by-product formation, but with high residual acidity, and that p-toluenesulfonic acid, a commonly used acid etherifying catalyst, affords lower yields of polymer, excessive by-product formation and high residual acidity.

We claim:

1. A method for the preparation of polycondensation oligomers of thiodiethanol with a molecular weight of about 300 to 5,300 which comprises condensing thiodiethanol or a mixture of a major proportion of thiodiethanol and one or more aliphatic diols at a temperature ranging from above about 150° C to 210° C in the presence of from about 0.5 to 20 percent by weight of an acid-acting carbon catalyst consisting essentially of acidic activated carbon and acidic activated charcoal, the acidity thereof being due to acidic sites on the catalyst surface, said catalyst being such that the pH of an aqueous slurry of a 5 gram portion of the catalyst in 50 ml. of water after stirring for 5 minutes is the same or lower than the pH of a 1 gram portion of the catalyst in 50 ml. of water after stirring for 5 minutes.

2. A method according to claim 1 wherein said catalyst is present in an amount of about 1 to 5% by weight.

Table II
Thiodiethanol Polymerization

| Exp. No. | Catalyst | Weight % | Polymerization Conditions Time Hrs. | Polymerization Conditions Temp. ° C | Distillate formed, as % of initial charge Total | Distillate formed, as % of initial charge Oil | OH No. | Mol. Wt. | Acid No. |
|---|---|---|---|---|---|---|---|---|---|
| 3 | B | 5 | — | 210 | No reaction | | | | |
| 4 | F | 5 | 2.5 | 210 | 24.0 | 7.5 | 131 | 860 | 0.10 |
| 5 | F* | 5 | 5.5 | 210 | 25.4 | 6.6 | 98 | 1150 | 0.08 |
| 6 | F | 3.3 | 5.0 | 210 | 28.2 | 13.3 | 21.2 | 5300 | 0.06 |
| 7 | F | 4.0 | 2.5 | 210 | 22.2 | 5.8 | 79 | 1400 | 0.08 |
| 8 | A | 5.0 | — | 210 | No reaction | | | | |
| 9 | D | 5.0 | 16 | 200–210 | 31.6 | 12.0 | — | 1200 | 0.02 |
| 10 | E | 5.0 | — | 200–210 | No reaction | | | | |

*Re-used

3. A method according to claim 1 wherein said catalyst is acidic activated carbon.

4. A method according to claim 1 wherein said catalyst is acidic activated charcoal.